(12) United States Patent
Nordquist et al.

(10) Patent No.: US 7,948,495 B1
(45) Date of Patent: May 24, 2011

(54) LINKING TEXTURE HEADERS AND TEXTURE SAMPLERS

(75) Inventors: Bryon S. Nordquist, Santa Clara, CA (US); Alexander L. Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 640 days.

(21) Appl. No.: 11/345,740

(22) Filed: Feb. 2, 2006

(51) Int. Cl.
*G06T 1/00* (2006.01)
(52) U.S. Cl. ........................................... 345/522
(58) Field of Classification Search .................... 345/552
See application file for complete search history.

(56) References Cited

U.S. PATENT DOCUMENTS

| | | | |
|---|---|---|---|
| 7,307,638 B2* | 12/2007 | Leather et al. | 345/582 |
| 2004/0160449 A1* | 8/2004 | Gossalia et al. | 345/543 |
| 2005/0122334 A1* | 6/2005 | Boyd et al. | 345/520 |
| 2008/0001952 A1* | 1/2008 | Srinivasan et al. | 345/502 |

* cited by examiner

*Primary Examiner* — Xiao M Wu
*Assistant Examiner* — Edward Martello
(74) *Attorney, Agent, or Firm* — Patterson & Sheridan, LLP

(57) ABSTRACT

Systems and methods used for binding texture state stored in independent structures may be used by more than one graphics applications programming interface (API). A texture header portion of the texture state defines texture data characteristics and is stored in a first structure. A texture sampler portion of the texture state specifies texture processing attributes and is stored in a second structure. A single unified structure is emulated for use by APIs that store the texture state in a single structure. Therefore, a graphics processor may support more than one graphics API for processing texture data.

11 Claims, 5 Drawing Sheets

LINKING TEXTURE HEADERS AND TEXTURE SAMPLERS

BACKGROUND OF THE INVENTION

1. Field of the Invention

Embodiments of the present invention generally relate to storing texture state in independent structures, and, more specifically, to binding a texture header to a texture sampler for use by a graphics processor.

2. Description of the Related Art

Conventional graphics applications programming interfaces (APIs) use a unified state structure to specify texture state. The texture state includes texture map specific characteristics and texture processing attributes. More recently, a graphics API separates the texture state, storing the texture map specific characteristics in a texture header structure and the texture processing attributes in a texture sampler structure. Separating the texture state allows greater flexibility for pairing a particular texture sampler state with more than one texture header state without storing a copy of the texture sampler state with each of the texture header states. Conversely, a particular texture header state may be paired with more than one texture sampler state.

Accordingly, it is desirable to store texture state provided by a conventional graphics API using a unified state structure in the texture header structure and texture sampler structure used by the graphics API supporting the separate texture state structures. Graphics processors may then execute shader programs provided by a conventional graphics API or the graphics API that supports separate texture state structures.

SUMMARY OF THE INVENTION

The current invention involves new systems and methods for binding texture state stored in independent structures for use by more than one graphics applications programming interface (API). A texture header portion of the texture state defines texture data characteristics and is stored in a first structure. A texture sampler portion of the texture state specifies texture processing attributes and is stored in a second structure. A single unified structure is emulated for use by APIs that store the texture state in a single structure. Therefore, a graphics processor may support more than one graphics API for processing texture data.

Various embodiments of a method of the invention for storing texture state provided by a graphics applications programming interface (API) include binding a first portion of the texture state to a header slot for a shader program by storing an index of a header state structure stored in memory in the header slot, binding a second portion of the texture state to a sampler slot for the shader program by storing an index of a sampler state structure stored in the memory in the sampler slot, and loading a binding table to associate the header slot with the header state structure in the memory.

Various embodiments of a method of the invention for loading texture state provided by a graphics applications programming interface (API) include receiving a load texture state instruction that includes a header slot and a sampler slot, reading a first portion of the texture state from a memory using the header slot, wherein the first portion of the texture state is stored in a header state structure within a first linear array of state structures, and reading a second portion of the texture state from the memory, wherein the second portion of the texture state is stored in a sampler state structure within a second linear array of state structures.

Various embodiments of the invention include a system for accessing texture state provided by a graphics applications programming interface (API) include a memory and a texture state setup unit. The memory is configured to store a first linear array of texture state structures and a second linear array of texture state structures. The texture state setup unit is configured to receive a load texture state instruction and to obtain a header state structure from the first linear array of texture state structures and a sampler state structure from the second linear array of texture state structures, wherein the load texture state instruction includes a header slot, a sampler slot, and a flag indicating whether or not the graphics API uses a unified texture state structure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for storing and loading texture state provided by graphics APIs that use a single unified texture state structure and graphics APIs that separate texture state into independent structures. The texture state provided as a single unified texture state structure may be separated into a texture header portion and a texture sampler portion by a device driver and stored in the independent structures to emulate a single structure from the API perspective. The texture header portion of the texture state corresponds to the texture map specific characteristics such as texture map image size, location in memory storing the texture map, texel format, e.g., RGB, YUV, 32 bits per texel, 16 bits per texel, normalized, nonnormalized, or the like, and texture map type, e.g., two-dimensional, three-dimensional, cubemap, or the like. The texture sampler portion of the texture state corresponds to texture processing attributes such as texture map filter modes, e.g., bilinear, trilinear, anisotropic ratios, and texture map wrap modes, e.g., mirror, wrap, or the like.

A binding mapping is maintained by the device driver to track the locations in memory where the texture header portions and texture sampler portions are stored. The texture state (texture header portions and texture sampler portions) may be stored in memory that is external to a graphics processor and may be read and used to process graphics data. A binding table within the graphics processor is loaded to provide a pointer to the texture header portion of the texture state and a pointer to the texture sampler portion of the texture state. The graphics processor can read various texture header portions and texture sampler portions from the external memory using the binding table. Therefore, all of the texture states used by a shader program do not need to be stored within a graphics processor requiring dedicated memory resources within the graphics processor. Alternatively, the texture state does not need to be provided with the graphics data since the texture state may be read from external memory as needed, and graphics processing throughput may be improved since the texture state is not passed through the graphics processing pipeline.

Figure 1:
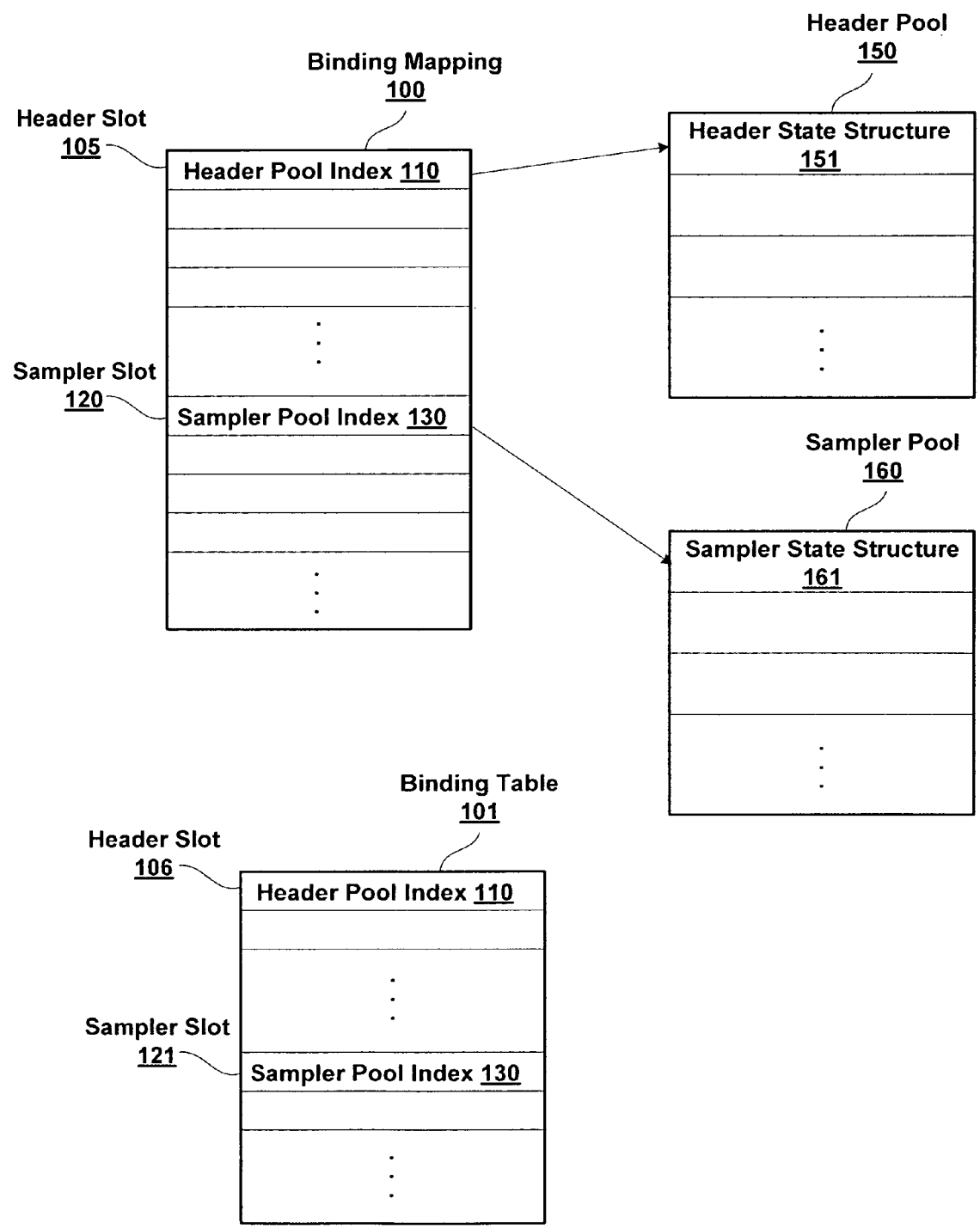
FIG. 1 is a conceptual diagram of a binding table, a first linear array of texture header state structures, and a second linear array of texture sampler state structures in accordance with one or more aspects of the present invention.

FIG. 1 is a conceptual diagram of a binding table 101, a linear array of texture header state structures, header pool 150, and a linear array of texture sampler state structures, sampler pool 160, in accordance with one or more aspects of the present invention. Header pool 150 and sampler pool 160 may be stored in memory that is external to a graphics processor. Binding mapping 100 may also be stored in memory that is external to the graphics processor and is maintained by a device driver. Binding table 101 is located within the graphics processor and is loaded by the device driver with at least a portion of the entries in binding mapping 100. Binding mapping 100 includes header and sampler slots and may have more slots than binding table 101. Binding mapping 100 should be configured to store as many texture header slots as there are header state structures stored in header pool 150 and as many texture sampler slots as there are sampler state structures.

Binding table 101 includes a fixed number of slots that may correspond to a maximum number of texture header and texture sampler states simultaneously supported by a shader program executed by the graphics processor. The device driver loads binding table 101 with the slots that are used by the shader programs that will be executed by the graphics processor. The number of texture header slots may be less than the number of header state structures in header pool 150. Likewise, the number of texture sampler slots may be less than the number of sampler state structures in sampler pool 160. In embodiments of the present invention where the number of slots in binding table 101 equals the number of slots in binding mapping 100, all of the entries in binding mapping 100 may be loaded into binding table 101.

As a graphics application creates new texture states, e.g., texture header state and texture sampler state, a graphics device driver allocates a free texture state structure from header pool 150 and sampler pool 160. Header state structure 151 has a pool index, header pool index 110 that indicates the location in header pool 150 where header state structure 151 is stored. When the header state stored in header state structure 151 is bound to header slot 105 by the graphics application, header pool index 110 is stored in header slot 105. Likewise, when the sampler state stored in sampler state structure 161 is bound to sampler slot 120 by the graphics application, sampler pool index 130 is stored in sampler slot 120.

The device driver loads binding table 101 to store the bindings for header state structure 151 and sampler state structure 161. Specifically, header slot 106 of binding table 101 that corresponds to header slot 105 of binding mapping 100 is loaded with header pool index 110. Likewise, sampler slot 120 of binding table 101 that corresponds to sampler slot 120 of binding mapping 100 is loaded with sampler pool index 130.

A header slot and/or a sampler slot, e.g., sampler slot 121 or header slot 106, may be passed to the graphics processor by the graphics device driver to configure the graphics processor according to a particular texture state corresponding to the header and/or sampler slot. The graphics processor then reads the header slot and/or the sampler slot of binding table 101 to obtain a header pool index and/or a sampler pool index. The header pool index and/or sampler pool index is used to read a header state structure from header pool 150 and/or a sampler state structure from sampler pool 160.

When the graphics application uses a graphics API with a single unified texture state structure, the header state structure 151 and sampler state structure 161 may be specified by the graphics device driver using a single slot of binding table 101 since there is a one-to-one correspondence between each header state structure in header pool 150 and each sampler state structure in sampler pool 160. For example, header slot 106 storing header pool index 110 may be provided by the graphics processor to read header state structure 151 and sampler state structure 161. When a graphics API with a single unified texture state structure is used sampler slots in binding table 101 are not needed.

Figure 2:
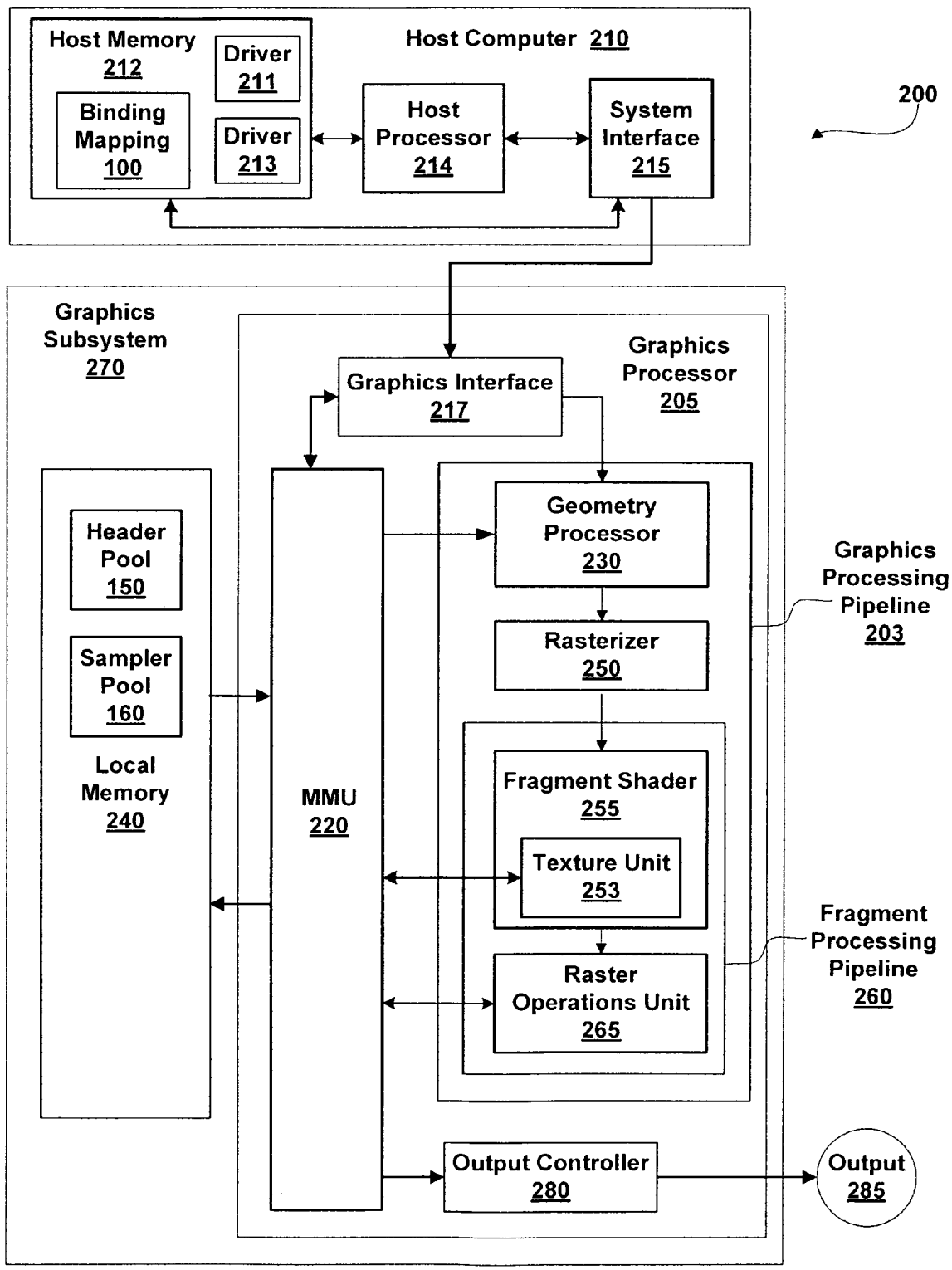
FIG. 2 is a block diagram of a graphics processing system including a graphics subsystem and a host computer in accordance with one or more aspects of the present invention.

FIG. 2 is a block diagram of an exemplary embodiment of a respective computer system, generally designated 200, and including a host computer 210, a graphics subsystem 270, and a texture unit 253, in accordance with one or more aspects of the present invention. Texture unit 253 is described in greater detail in conjunction with FIGS. 3A and 3B. Computing system 200 may be a desktop computer, server, laptop computer, palm-sized computer, tablet computer, game console, portable wireless terminal such as a personal digital assistant or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

A graphics device driver, e.g., driver 213 and driver 211, interfaces between processes executed by host processor 214, such as application programs, and a programmable graphics processor 205, translating program instructions as needed for execution by programmable graphics processor 205. Driver 211 is configured to interface between a graphics application using graphics API with a single unified texture state structure, such as the OpenGL graphics API. Driver 213 is configured to interface between a graphics application using graphics API with separate texture state structures, such as the DX10 graphics API. Drivers 213 and 211 each use commands to configure sub-units within programmable graphics processor 205. Specifically, drivers 211 and 213 may specify that a particular texture state, corresponding to a header slot and/or a sampler slot, should be loaded into texture unit 253. Drivers 211 and 213 also allocate free texture state structures from header pool 150 and sampler pool 160 and updates binding mapping 100 as header slots and sampler slots are bound to the free texture state structures. Binding mapping 100 may be stored in host memory 212 or in local memory 240. Drivers 211 and 213 also load binding table 101 with entries from binding mapping 100 as needed to execute shader programs.

Graphics subsystem 270 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including header pool 150, sampler pool 160, and program instructions, where graphics data is any data that is input to or output from computation units within programmable graphics processor 205. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like. Furthermore, header pool 150 and sampler pool 160 may be stored in host memory 212.

In addition to Interface 217, programmable graphics processor 205 includes a graphics processing pipeline 203, a memory management unit (MMU) 220 and an output controller 280. Data and program instructions received at interface 217 can be passed to a geometry processor 230 within graphics processing pipeline 203 or written to local memory 240 through MMU 220. In addition to communicating with local memory 240, and interface 217, MMU 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within geometry processor 230 and rasterizer 250. Shader programs are sequences of shader program instructions compiled by host processor 214 for execution within fragment processing pipeline 260. Geometry processor 230 receives a stream of program instructions (vertex program instructions and shader program instructions) and data from interface 217 or MMU 220, and performs vector floating-point operations or other processing operations using the data. The program instructions configure subunits within geometry processor 230, rasterizer 250 and fragment processing pipeline 260. The program instructions and data are stored in graphics memory, e.g., portions of host memory 212, local memory 240, or storage resources within programmable graphics processor 205. Configuration information may be written to registers within geometry processor 230, rasterizer 250 and fragment processing pipeline 260 using program instructions, encoded with the data, or the like. Specifically, configuration information, such as texture state, may be loaded into registers within texture unit 253 as needed when a texture state load instruction is processed.

Data processed by geometry processor 230 and program instructions are passed from geometry processor 230 to a rasterizer 250. Rasterizer 250 is a sampling unit that processes primitives and generates sub-primitive data, such as fragment data, including parameters associated with fragments (texture identifiers, texture compression formats, texture coordinates, and the like). Rasterizer 250 converts the primitives into sub-primitive data by performing scan conversion on the data processed by geometry processor 230. Rasterizer 250 outputs fragment data and shader program instructions to fragment processing pipeline 260.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. Fragment shader 255 may include one or more texture unit 253. Texture unit 253 is configured to read texture state from header pool 150 and sampler pool 160 and to read texture map data (texels) stored in graphics memory. Texture map data may be applied to the fragment data using techniques known to those skilled in the art to produce shaded fragment data.

Fragment shader 255 outputs the shaded fragment data, e.g., bitmap, color, and depth, and codewords generated from shader program instructions to raster operations unit 265. Raster operations unit 265 includes a read interface and a write interface to memory controller 220 through which raster operations unit 265 accesses data stored in local memory 240 or host memory 212. Raster operations unit 265 may perform near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory.

When processing is completed, an output 285 of graphics subsystem 207 is provided using output controller 280. Alternatively, host processor 214 reads the image stored in local memory 240 through MMU 220, interface 217 and system interface 215. Output controller 280 is optionally configured by opcodes to deliver data to a display device, network, electronic control system, other computing system 200, other graphics subsystem 207, or the like.

Figure 3A:
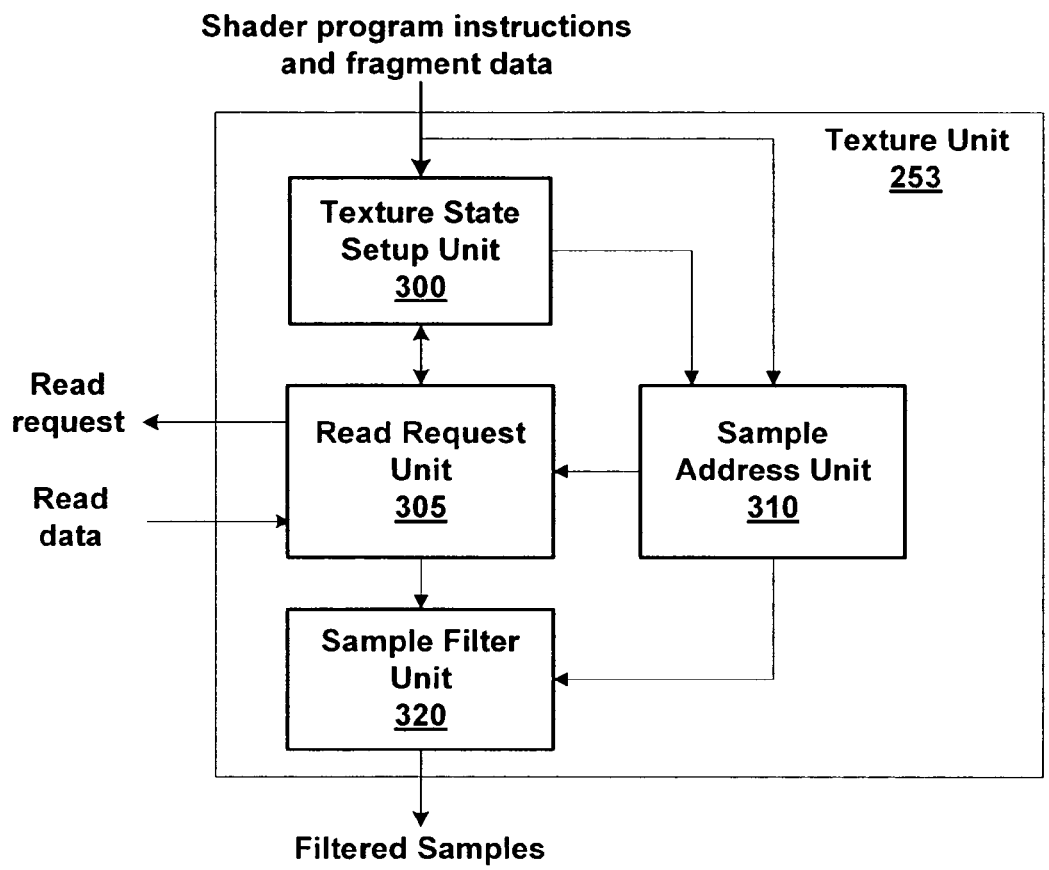
FIG. 3A is an exemplary block diagram of the texture unit of FIG. 2 in accordance with one or more aspects of the present invention.

FIG. 3A is an exemplary block diagram of the texture unit 253 of FIG. 2 in accordance with one or more aspects of the present invention. Texture Unit 253 receives shader program instructions and fragment data from fragment shader 255 and outputs filtered samples. The shader program instructions may include one or more texture state load instructions to configure texture unit 253 to load a particular texture state read from header pool 150 and sampler pool 160. Texture unit 253 may also receive binding table load instructions that are used to store header pool indexes and sampler pool indexes in binding table 101. Texture unit 253 includes a texture state setup unit 300, a read request unit 305, a sample address unit 310, and a sampler filter unit 320. Texture state setup unit 300 executes the texture state load instructions and is described in detail in conjunction with FIG. 3B.

Sample address unit 310 receives the fragment data that includes texture map coordinates and produces texture read requests that are output to read request unit 305 to read texture data. Sample address unit 310 receives configuration information, e.g., texture header state and texture sampler state, from texture state setup unit 300. For example, the received texture header state may include a base address for a texture map, texel format information, and the texture map dimensions. The received texture sampler information may include a filter mode and/or a wrap mode. The texture header state and texture sampler state is used by sample address unit 310 to produce one or more read addresses, using techniques known to those skilled in the art, that are output to read request unit 305. Sample address unit 310 also outputs sample weights that are output to sample filter unit 320 along with any filter mode information that is needed by sample filter unit 320.

Read request unit 305 receives read addresses from texture state setup unit 300 and sample address unit 310. The read addresses received from texture state setup unit 300 correspond to header state structures and/or sample state structures. The read addresses received from sample address unit 310 correspond to texture data. A shader program may setup a texture state and then read texture data to process fragments using the texture state. The texture state may then be changed, by loading a different header state and/or sampler state before processing additional fragments. Read request unit 305 outputs read requests to MMU 220 and the read data, e.g., texture data or texture state, is returned from MMU 220 to read request unit 305. Read request unit 305 outputs texture state to texture state setup unit 300 and outputs texture data to sample filter unit 320.

Sample filter unit 320 receives the texture data from read request unit 305 and sample weights from sample address unit 310. Texels within the texture data may be combined with the sample weights to produce filtered samples, e.g., bilinearly filtered samples, trilinearly filtered samples, anisotropically filtered samples, or the like. The filtered samples are output by texture unit 253 for further processing by fragment shader 255.

Figure 3B:
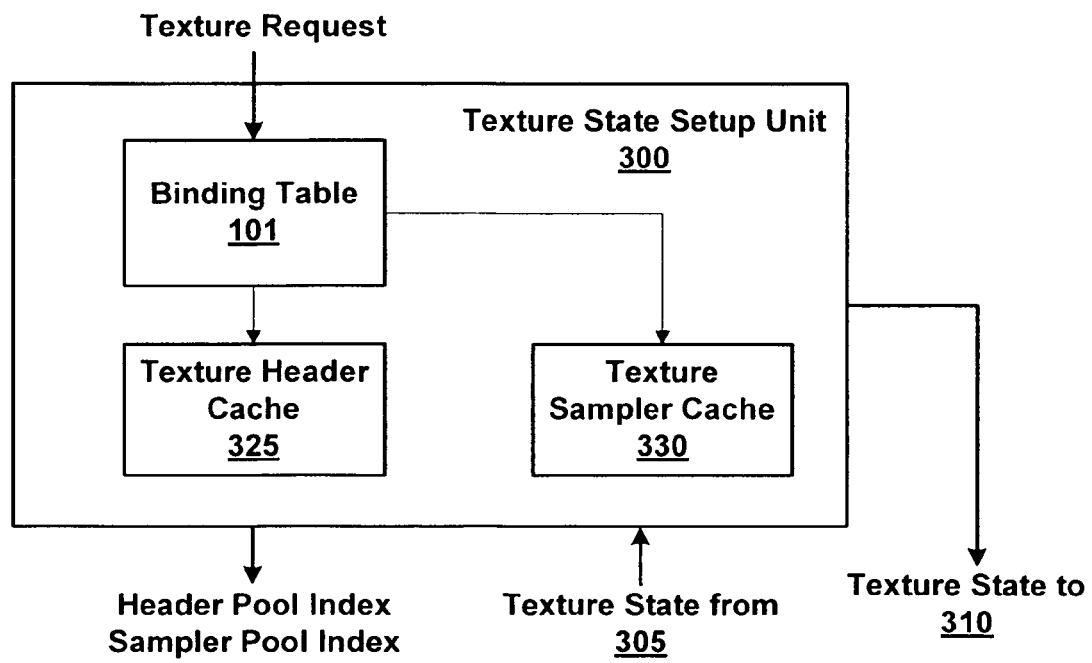
FIG. 3B is an exemplary block diagram of the texture state setup unit of FIG. 3A in accordance with one or more aspects of the present invention.

FIG. 3B is an exemplary block diagram of texture state setup unit 300 of FIG. 3A, in accordance with one or more aspects of the present invention. Texture state setup unit 300 includes binding table 101, a texture header cache 325, and a texture sampler cache 330. Texture state setup unit 300 receives header pool indexes and sampler pool indexes to write in header slots and sampler slots, respectively, of binding table 101. Texture state setup unit 300 also receives texture state load instructions during execution of a shader program. Each texture state load instruction includes a header slot, a sampler slot, and a flag indicating whether or not the graphics API uses a unified texture state structure. When a texture state load instruction is executed by texture setup unit 300 a header pool index and/or a sampler pool index are output to read request unit 305 when the header state structure or the sampler state structure is not available in texture header cache 325 or texture sampler cache 330, respectively.

Texture state setup unit 300 executes a texture state load instruction by reading a header slot of binding table 101 to obtain a header pool index. When the flag indicates that the graphics API uses a unified texture state structure, the header pool index is copied for output as the sampler pool index. When the flag indicates that the graphics API does not use a unified texture state structure, the sampler pool index is read from binding table 101 using the sampler slot received with the texture state load instruction. The header pool index is output by binding table 101 to texture header cache 325 and the sampler pool index is output to texture sampler cache 330. In some embodiments of the present invention, texture header cache 325 and texture sampler cache 330 are omitted and the header pool index and the sampler pool index are output by binding table 101 directly to read request unit 305.

When the header state structure corresponding to the header pool index is not available in texture header cache 325, the header pool index is output to read request unit 305. Likewise, when the sampler state structure corresponding to the sampler pool index is not available in texture sampler cache 330, the sampler pool index is output to read request unit 305. The header pool index and sampler pool index may be combined with a base address for header pool 150 and sampler pool 160, respectively, before being output to read request unit 305. Alternatively, read request unit 305 may combine the header pool index and the sampler pool index with a base address for header pool 150 and sampler pool 160, respectively, to produce addresses in local memory 240 or host memory 212.

Texture state setup unit 300 receives read data, texture state, from read request unit 305. Texture state setup unit 300 may store the texture state in a storage resource within texture state setup unit 300 and output the texture state to sample address unit 310. Alternatively, texture state setup unit 300 may output the texture state to sample address unit 310 for storage in that unit.

Figure 4A:
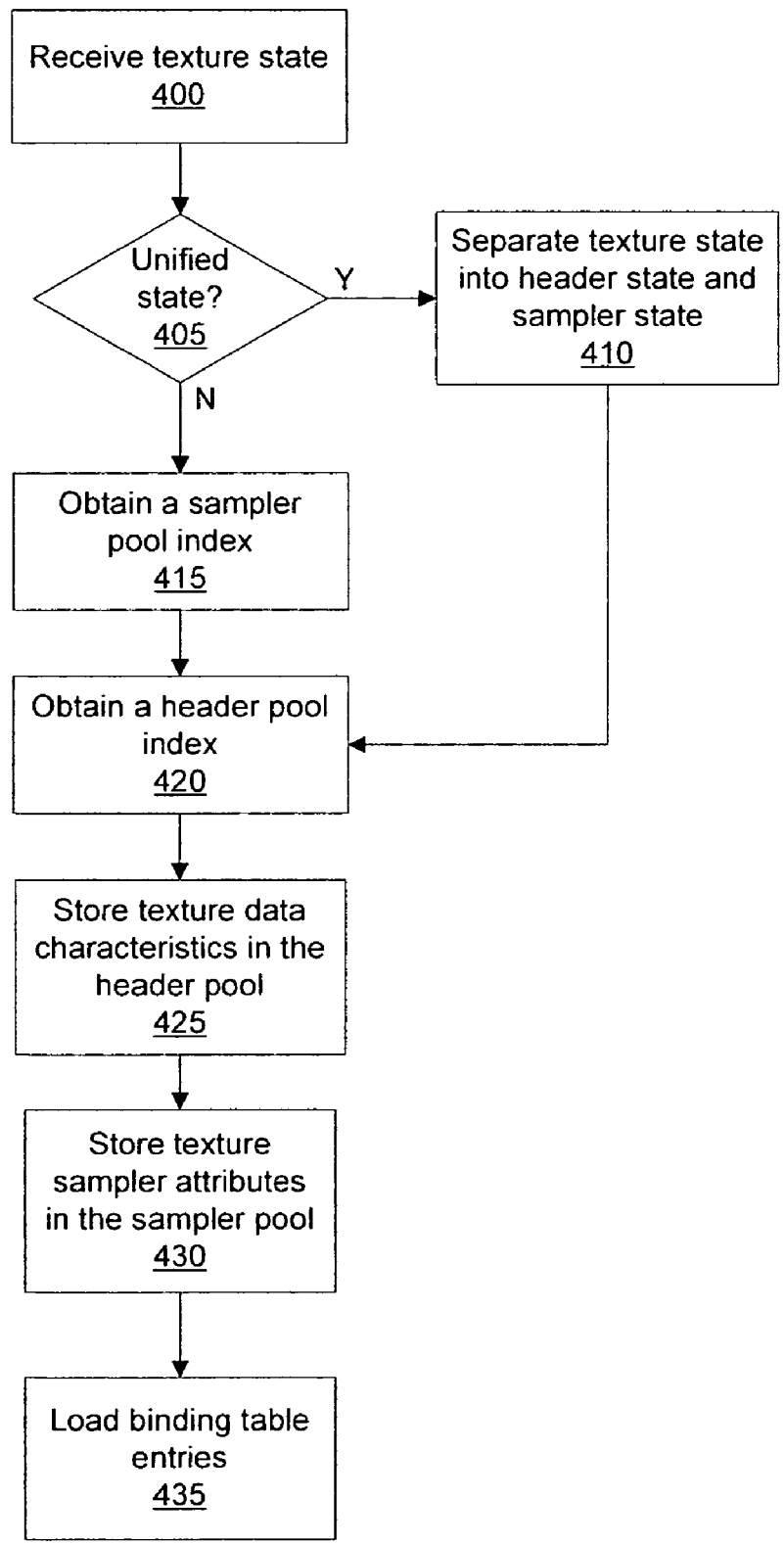
FIG. 4A illustrates a flow diagram of an exemplary method of storing texture state provided by a graphics API in accordance with one or more aspects of the present invention.

FIG. 4A illustrates a flow diagram of an exemplary method of storing texture state provided by a graphics API in accordance with one or more aspects of the present invention. In step 400 a graphics device driver, such as driver 211 or 213, receives texture state from a graphics application. In step 405 the graphics device driver determines if the graphics API of the graphics application uses a unified texture state structure and, if so, in step 410 the graphics device driver separates the texture state into header state and sampler state and proceeds to step 420.

If, in step 405 the graphics device driver determines that the graphics API of the graphics application does not use a unified texture state structure, then in step 415 the graphics device driver obtains a free sampler pool index for sampler pool 160. In step 420 the graphics device driver obtains a free header pool index for header pool 150. In step 425 the graphics device driver stores the texture data characteristics portion of the texture state (header state) in header pool 150 using the header pool index obtained in step 420 and stores the header pool index in a header slot of binding mapping 100. In step 430 the graphics device driver stores the texture sampler attributes portion of the texture state (sampler state) in sampler pool 160 and stores the sampler pool index in a sampler slot of binding mapping 100. When the graphics API of the graphics application uses a unified texture state structure the header pool index obtained in step 420 is used to store the sampler state in sampler pool 160. When the graphics API of the graphics application does not use a unified texture state structure the sampler pool index obtained in step 415 is used to store the sampler state in sampler pool 160. In step 435 the graphics device driver loads a header slot of binding table 101 with the header pool index. In step 435 the graphics device driver also loads a sampler slot of binding table 101 with the sampler pool index when the graphics API of the graphics application uses a unified texture state structure.

Texture state that is stored in header pool 150 and sampler pool 160 may be loaded by the graphics application during execution of a shader program and used to process fragment data. Therefore, the texture state does not need to be passed through graphics processing pipeline 203 along with graphics data that is being processed. Furthermore, the texture state may be loaded as needed rather than being stored within texture unit 253.

Figure 4B:
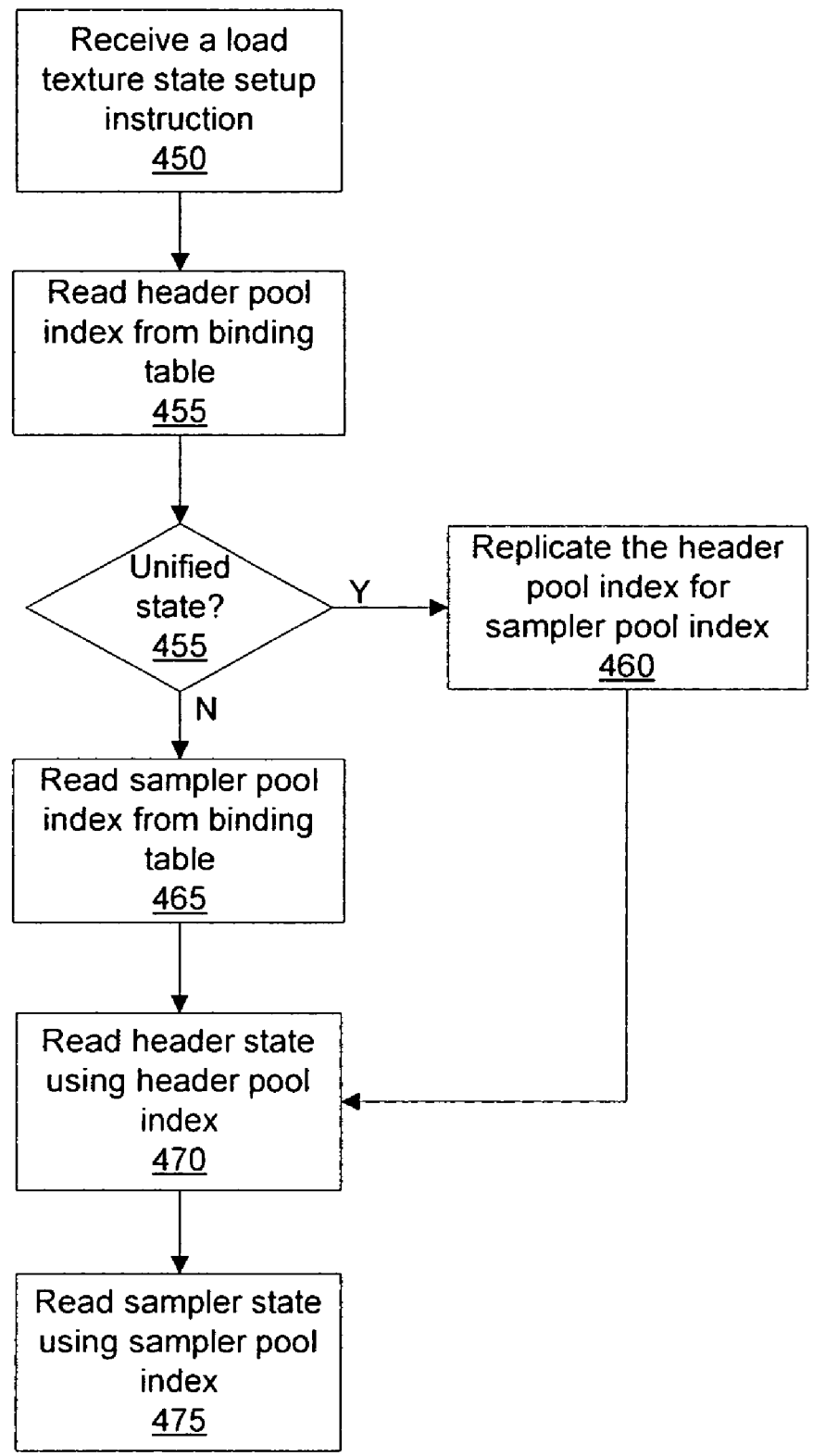
FIG. 4B illustrates a flow diagram of loading the texture state provided by a graphics API into a graphics processor in accordance with one or more aspects of the present invention.

FIG. 4B illustrates a flow diagram of loading the texture state provided by a graphics API into a graphics processor in accordance with one or more aspects of the present invention. In step 450 texture unit 253 receives a load texture state instruction. As previously described, the load texture state instruction includes a header slot, a sampler slot, and a flag indicating whether or not the graphics API uses a unified texture state structure. In step 455 texture state setup unit 300 reads a header pool index from binding table 101 using the header slot. In step 455 binding table 101 determines if the flag indicates that the graphics API uses a unified texture state structure, and, if so, in step 460 binding table 101 replicates the header pool index (read using the header slot) for the sampler pool index.

If, in step 455 binding table 101 determines that the flag indicates that the graphics API does not use a unified texture state structure, then in step 465 binding table 101 reads the sampler pool index using the sampler slot. In step 470 binding table 101 outputs the header pool index to texture header cache 325 to read the header state. If the header state is not available in texture header cache 325, then texture header cache 325 outputs a read request to read request unit 305 to obtain the header state from header pool 150. In step 475 binding table 101 outputs the sampler pool index to texture sampler cache 330 to read the sampler state. If the sampler state is not available in texture sampler cache 330, then texture sampler cache 330 outputs a read request to read request unit 305 to obtain the sampler state from sampler pool 160.

Persons skilled in the art will appreciate that any system configured to perform the method steps of FIG. 3A or 3B, or their equivalents, is within the scope of the present invention. Systems and methods used for binding texture state stored in independent structures may be used by more than one graphics applications programming interface (API). A texture header portion of the texture state defines texture data characteristics and is stored in a first structure. A texture sampler portion of the texture state specifies texture processing attributes and is stored in a second structure. A single unified structure is emulated for use by APIs that store the texture state in a single structure. Therefore, a graphics processor may support more than one graphics API for processing texture data.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of storing texture state provided by a graphics applications programming interface (API), comprising:
  receiving, at a texture state setup unit, texture state that includes texture map-specific characteristics and texture processing attributes from a graphics API;
  determining whether the texture state is stored in a unified state data structure that does not separately store the texture map-specific characteristics and the texture processing attributes;
  storing a header pool index associated with a header state data structure including a first portion of the texture state in a header slot within a mapping table stored in memory, wherein the first portion of the texture state corresponds to the texture map-specific characteristics;
  storing a sampler pool index associated with a sampler state data structure including a second portion of the texture state in a sampler slot within the mapping table, wherein the second portion of the texture state corresponds to the texture processing attributes, and wherein the sampler pool index is equal to the header pool index when the texture state is stored in the unified state data structure;
  updating a binding table stored in the memory to associate the header slot with the header state data structure; and
  updating the binding table to associate the sampler slot with the sampler state data structure only when the texture state is not stored in the unified state data structure.

2. The method of claim 1, further comprising separating the texture state into the first portion and the second portion when the texture state is stored in the unified state data structure.

3. The method of claim 2, wherein the header pool index associated with the header state data structure is used to access the sampler state data structure when the texture state is stored in the unified state data structure.

4. The method of claim 1, the first portion of the texture state corresponds to texture-map specific characteristics that include one or more of texture map image size, texel format, and texture map type.

5. The method of claim 1, wherein the second portion of the texture state corresponds to texture processing attributes that include at least one of texture map filter mode and texture map wrap mode.

6. The method of claim 1, wherein the header state data structure stored in the memory corresponds to a texture state data structure within a linear array of texture state data structures.

7. The method of claim 1, further comprising:
  receiving a load texture state instruction that includes the header slot; and
  reading the first portion of texture state from the memory using the header slot.

8. The method of claim 7, wherein the load texture state instruction includes the sampler slot and further comprising reading the second portion of texture state from the memory using the sampler slot when graphics API uses separate texture state data structures.

9. A system for accessing texture state provided by a graphics applications programming interface (API), comprising:
  a memory configured to store a first linear array of texture state data structures and a second linear array of texture state data structures;
  a texture state setup unit configured to receive a load texture state instruction and to obtain a header state data structure from the first linear array of texture state data structures and a sampler state data structure from the second linear array of texture state data structures, wherein the load texture state instruction includes a header slot, a sampler slot, and a flag indicating whether the texture state is stored in a unified state data structure;
  a binding table configured to store header pool indexes in header slots and sampler pool indexes in sampler slots, wherein each one of the header pool indexes specifies one header state data structure within the first linear array of texture state data structures, and each one of the sampler pool indexes specifies one sampler state data structure within the second linear array of texture state data structures, wherein the texture state setup unit is configured to read the sampler state data structure from the memory based on a header pool index stored in the header slot when the flag indicates that the texture state is stored in the unified state data structure, and wherein the texture state setup unit is configured to read the sampler state data structure from the memory based on a sampler pool index stored in the sampler slot only when the flag indicates that texture state is not stored in a unified state data structure.

10. The system of claim 9, further comprising a cache configured to store at least one of the texture state data structures in the first linear array of texture state data structures.

11. The system of claim 9, wherein the texture state setup unit reads the sampler state data structure or the header state data structure directly from the memory rather than receiving the sampler state data structure or the header state data structure through a graphics processing pipeline.

* * * * *